(12) United States Patent
Suzuki

(10) Patent No.: US 10,933,875 B2
(45) Date of Patent: Mar. 2, 2021

(54) VEHICLE TURNING CONTROL DEVICE

(71) Applicant: NTN CORPORATION, Osaka (JP)

(72) Inventor: Yuta Suzuki, Iwata (JP)

(73) Assignee: NTN CORPORATION, Osaka (JP)

( * ) Notice: Subject to any disclaimer, the term of this patent is extended or adjusted under 35 U.S.C. 154(b) by 275 days.

(21) Appl. No.: 16/195,031

(22) Filed: Nov. 19, 2018

(65) Prior Publication Data

US 2019/0084570 A1    Mar. 21, 2019

Related U.S. Application Data

(63) Continuation of application No. PCT/JP2017/018626, filed on May 18, 2017.

(30) Foreign Application Priority Data

May 25, 2016    (JP) .............................. JP2016-104054

(51) Int. Cl.
*B60W 30/18* (2012.01)
*B60W 40/068* (2012.01)
(Continued)

(52) U.S. Cl.
CPC ......... *B60W 30/18145* (2013.01); *B60L 9/18* (2013.01); *B60L 15/20* (2013.01); *B60T 8/172* (2013.01); *B60T 8/1755* (2013.01); *B60W 10/08* (2013.01); *B60W 10/18* (2013.01); *B60W 10/184* (2013.01); *B60W 30/045* (2013.01);
(Continued)

(58) Field of Classification Search
None
See application file for complete search history.

(56) References Cited

U.S. PATENT DOCUMENTS 5,386,365 A * 1/1995 Nagaoka ................ B62D 7/159
701/44
6,074,020 A  6/2000 Takahashi et al.
(Continued)

FOREIGN PATENT DOCUMENTS

DE   112004001555 B4 * 9/2010  .......... B60W 40/068
DE   10 2011 077153 A1  1/2012
(Continued)

OTHER PUBLICATIONS

International Search Report dated Aug. 15, 2017 in corresponding International Application No. PCT/JP2017/018626.
(Continued)

*Primary Examiner* — Abdhesh K Jha

(57) ABSTRACT

Provided is a vehicle turning control device which prevents a target yaw rate from being unstable, even if a control gain is changed in accordance with the magnitude of a yaw rate deviation or a road surface frictional coefficient. This vehicle turning control device includes a target yaw rate correction (32). The correction (32) calculates a target yaw rate with respect to the control gain determined based on a vehicle traveling information, using at least one of a plurality of calculated target yaw rates. The control gain is determined such that, as a road surface frictional coefficient decreases or as a yaw rate deviation increases, a yaw response characteristic approaches a basic yaw response characteristic from an initial yaw response characteristic.

5 Claims, 11 Drawing Sheets

(51) Int. Cl.
- *B60W 10/08* (2006.01)
- *B60L 9/18* (2006.01)
- *B60L 15/20* (2006.01)
- *B62D 9/00* (2006.01)
- *B62D 6/00* (2006.01)
- *B60W 40/114* (2012.01)
- *B60T 8/172* (2006.01)
- *B60T 8/1755* (2006.01)
- *B60W 30/045* (2012.01)
- *B60W 10/184* (2012.01)
- *B60W 10/18* (2012.01)
- *B62D 15/02* (2006.01)

(52) U.S. Cl.
CPC ........ *B60W 40/068* (2013.01); *B60W 40/114* (2013.01); *B62D 6/003* (2013.01); *B62D 9/002* (2013.01); *B62D 15/021* (2013.01); *B60T 2250/03* (2013.01); *B60W 2520/10* (2013.01); *B60W 2520/14* (2013.01); *B60W 2540/18* (2013.01); *B60W 2552/40* (2020.02); *B60W 2710/083* (2013.01); *B60W 2710/18* (2013.01); *Y02T 10/72* (2013.01)

(56) References Cited

U.S. PATENT DOCUMENTS

| | | |
|---|---|---|
| 6,092,882 A | 7/2000 | Matsuno |
| 6,155,655 A | 12/2000 | Matsuno |
| 6,708,088 B2 | 3/2004 | Matsuno et al. |
| 6,842,683 B2 * | 1/2005 | Kim ..................... B60T 8/1755 180/197 |
| 9,487,232 B2 | 11/2016 | Ohmura et al. |
| 2002/0153770 A1 | 10/2002 | Matsuno et al. |
| 2015/0175196 A1 | 6/2015 | Ohmura et al. |
| 2016/0137176 A1 | 5/2016 | Akutsu et al. |
| 2017/0057494 A1* | 3/2017 | Sato ................ B60W 30/18172 |
| 2018/0304768 A1 | 10/2018 | Suzuki |

FOREIGN PATENT DOCUMENTS

| | | | | |
|---|---|---|---|---|
| JP | 9-86365 | | 3/1997 | |
| JP | 2001-354131 | | 12/2001 | |
| JP | 2002-316546 | | 10/2002 | |
| JP | 3882116 B2 | * | 2/2007 | ........... B60T 8/1755 |
| JP | 2007-112179 | | 5/2007 | |
| JP | 2008-033807 A | | 2/2008 | |
| JP | 2009-286159 | | 12/2009 | |
| JP | 2015-120415 | | 7/2015 | |
| JP | 2015209128 A | * | 11/2015 | |
| JP | 2017100504 A | * | 6/2017 | |
| JP | 2017210018 A | * | 11/2017 | ........... B60T 8/1755 |
| JP | 6578212 B | | 8/2019 | |

OTHER PUBLICATIONS

Extended European Search Report dated Apr. 8, 2020, in European Patent Application No. 17802662.1 (6 pages).

English Translation of the International Preliminary Report on Patentability dated Dec. 6, 2018 in corresponding International Patent Application No. PCT/JP2017/018626, 7 pages.

Notice of Reasons for Refusal dated Jan. 14, 2020 in Japanese Patent Application No. 2016-104054 (4 pages) (4 pages English Translation).

* cited by examiner

CASE OF FOUR-WHEEL IWM VEHICLE

Fig. 13A  CASE OF FOUR-WHEEL DRIVE VEHICLE
(YAW MOMENT CONTROL BY FRICTION BRAKE)
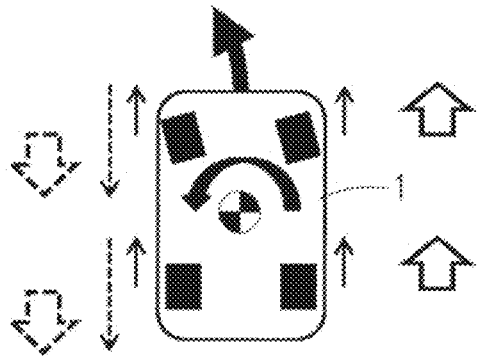
Fig. 13B  CASE OF FRONT-WHEEL DRIVE VEHICLE
(YAW MOMENT CONTROL BY FRICTION BRAKE)
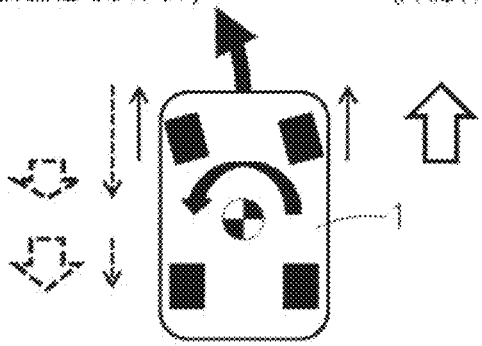
Fig. 13C  CASE OF REAR-WHEEL DRIVE VEHICLE
(YAW MOMENT CONTROL BY FRICTION BRAKE)
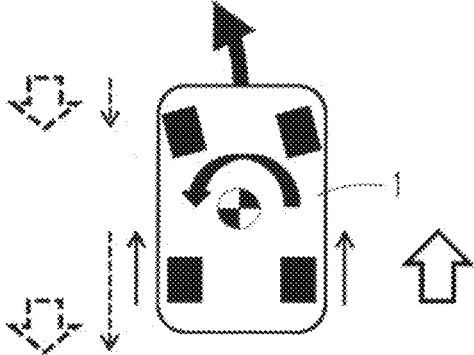

VEHICLE TURNING CONTROL DEVICE

CROSS REFERENCE TO THE RELATED APPLICATION

This application is a continuation application, under 35 U.S.C. § 111(a), of international application No. PCT/JP2017/018626, filed May 18, 2017, which claims Convention priority to Japanese patent application No. 2016-104054, filed May 25, 2016, the entire disclosure of which is herein incorporated by reference as a part of this application.

BACKGROUND OF THE INVENTION

Field of the Invention

The present invention relates to a vehicle turning control device that improves vehicle turning performance and stabilizes the vehicle attitude at a place having a low road surface frictional coefficient, or the like.

Description of Related Art

Conventionally, yaw angle model following control for improving turning performance based on a braking/driving torque difference between right and left wheels, and yaw moment control in a skid prevention control device (Electronic Stability Control (ESC), etc.) for stabilizing the vehicle attitude, have been proposed.

For example, a proposed control device improves turning performance by yaw moment control using feedforward control and feedback control in combination. The device switches from the yaw moment control to vehicle behavior stabilization control as the turning degree approaches the limit (Patent Document 1).

RELATED DOCUMENT

Patent Document

[Patent Document 1] JP Laid-open Patent Publication No. 2015-120415

SUMMARY OF THE INVENTION

In the yaw moment control of Patent Document 1, tire grip is not taken into consideration, and therefore the following problem arises. For example, when yaw moment control for improving turning performance is performed while a vehicle travels on the road with a low road surface frictional coefficient, tire grip exceeds the limit, which destabilizes the vehicle.

If the turning degree approaches the limit and the control is switched to vehicle behavior stabilization control from the yaw moment control, when the yaw moment control for improving turning performance is switched to the vehicle behavior stabilization control, the vehicle turning characteristic with respect to steering varies between before and after the switching. Therefore, uncomfortable feeling might be given to a driver.

An object of the present invention is to provide a vehicle turning control device preventing the target yaw rate from being unstable, even if a control gain is changed in accordance with the magnitude of a yaw rate deviation or a road surface frictional coefficient in such a way as to give no uncomfortable feeling to a driver.

In the following description, the reference characters in the embodiments are used for convenience sake in order to facilitate the understanding.

A vehicle turning control device according to one aspect of the present invention is a vehicle turning control device for controlling a turning characteristic of a vehicle, the vehicle including: braking/driving sources 5 for independently controlling a braking/driving torques, the braking/driving torques being braking torques or driving torques for respective wheels at right and left on a front side and a rear side; an operation mechanism 17; a vehicle speed detector 18 for detecting a vehicle speed; a steering angle detector 19 for detecting a steering angle; a yaw rate detector 20 for detecting an actual yaw rate; and a driving controller 10 for distributing a braking/driving command value to each of the braking/driving sources 5 in response to a command from the operation mechanism 17, the vehicle turning control device comprising:

a vehicle traveling value information calculation module 29, 24 configured to calculate a vehicle traveling information value including at least one of a yaw rate deviation and a road surface frictional coefficient, the yaw rate deviation being calculated from a difference between a target yaw rate and the actual yaw rate detected by the yaw rate detector 20, the target yaw rate being calculated with respect to the vehicle speed detected by the vehicle speed detector 18 and the steering angle detected by the steering angle detector 19;

a plural-target-yaw-rate calculation module 25 configured to obtain respective target yaw rates with respect to a predetermined plurality of control gains on the basis of a yaw response characteristic;

a control gain calculation module 26 configured to determine a control gain on the basis of the vehicle traveling information value calculated by the vehicle traveling information calculation module 29, 24; and a target yaw rate correction module 32 configured to obtain a target yaw rate with respect to the control gain calculated by the control gain calculation module 26, using at least one of the plurality of target yaw rates calculated by the plural-target-yaw-rate calculation module 25, wherein the control gain calculation module determines the control gain such that, as the road surface frictional coefficient decreases, or as the yaw rate deviation increases, the yaw response characteristic approaches a basic yaw response characteristic from an initial yaw response characteristic.

The "turning characteristic" indicates not only a characteristic of ease in turning of the vehicle but also stability of the vehicle attitude during turning of the vehicle.

The "basic yaw response characteristic" refers to the yaw response characteristic of the vehicle itself (the yaw response inherent in the vehicle), i.e., a yaw response characteristic based on performance and structure of the vehicle, which is independent from the external environment.

The "initial yaw response characteristic" is predetermined, unlike the basic yaw response characteristic.

In the above configuration, the target yaw rate correction module 32, using at least one of the plurality of target yaw rates calculated by the plural-target-yaw-rate calculation module 25, calculates the target yaw rate with respect to the control gain calculated on the basis of one or both of the yaw rate deviation calculated by the yaw rate deviation calculation module 29 and the road surface frictional coefficient calculated by the road surface frictional coefficient calculation module 24, and the control gain is determined such that, as the road surface frictional coefficient decreases or as the yaw rate deviation increases, the response characteristic approaches the basic yaw response characteristic from the initial yaw response characteristic. In this way, even if the control gain is changed on the basis of the magnitude of the yaw rate deviation or the road surface frictional coefficient, the target yaw rate is not directly determined from a response characteristic, which prevents the target yaw rate from being unstable.

The vehicle turning control device may further include: a plural-yaw-moment calculation module 27 configured to calculate respective yaw moments with respect to the predetermined plurality of control gains; and a yaw moment correction module 33 configured to obtain a yaw moment with respect to the control gain calculated by the control gain calculation module 26, using at least one of the plurality of yaw moments calculated by the plural-yaw-moment calculation module 27, wherein on the basis of the yaw moment calculated by the yaw moment correction module 33, the braking/driving torques for the wheels at right and left on the front side and the rear side may be calculated to be outputted.

In the above configuration, even if the control gain is changed, the yaw moment is not directly determined from a response characteristic, and therefore an undesired yaw moment is avoided.

The target yaw rate correction module 32 may obtain the target yaw rate with respect to the control gain calculated by the control gain calculation module 26 by approximating the target rate with interpolation between two control gains having magnitudes next to each other, of the predetermined plurality of control gains. The approximation with the interpolation between two control gains next to each other as described above prevents the vehicle attitude stabilization control from being unstable no matter how the yaw response characteristic is changed.

The yaw moment correction module 33 may obtain a target yaw moment with respect to the control gain calculated by the control gain calculation module 26 by approximating the target yaw moment with interpolation between two control gains having magnitudes next to each other, of the predetermined plurality of control gains. The approximation with the interpolation between two control gains next to each other as described above avoids an undesired yaw moment due to the yaw moment control no matter how the yaw response characteristic is changed.

The vehicle turning control device may be configured as follows: the vehicle traveling value information includes at least the road surface frictional coefficient, the predetermined plurality of control gains include at least first and second control gains $\alpha_1$, $\alpha_2$ which satisfy a magnitude relationship of $\alpha_1 < \alpha_2$, and in the vehicle turning control device, two different road surface frictional coefficient threshold values that are a first road surface frictional coefficient threshold value $\mu_a$ and a second road surface frictional coefficient threshold value $\mu_b$ satisfying a magnitude relationship of $\mu_a > \mu_b$ are predetermined for the road surface frictional coefficient, and the target yaw rate correction module 32 or the yaw moment correction module 33 when the road surface frictional coefficient is greater than the first road surface frictional coefficient threshold value $\mu_a$, uses the target yaw rate calculated by the plural-target-yaw-rate calculation module 25 or the yaw moment calculated by the plural-yaw-moment calculation module 27 with respect to the second control gain $\alpha_2$, as the target yaw rate or the yaw moment with respect to the control gain calculated by the control gain calculation module 26, when the road surface frictional coefficient is smaller than the second road surface frictional coefficient threshold value uses the target yaw rate calculated by the plural-target-yaw-rate calculation module 25 or the yaw moment calculated by the plural-yaw-moment calculation module 27 with respect to the first control gain $\alpha_1$, as the target yaw rate or the yaw moment with respect to the control gain calculated by the control gain calculation module 26, and when the road surface frictional coefficient is smaller than the first road surface frictional coefficient threshold value $\mu_a$ and greater than the second road surface frictional coefficient $\mu_b$, uses the target yaw rate approximated with the interpolation, as the target yaw rate or the yaw moment with respect to the control gain calculated by the control gain calculation module 26.

In the above configuration, as the road surface frictional coefficient decreases, the yaw response characteristic is caused to approach the basic yaw response characteristic, whereby the vehicle attitude can be kept in a stable state even on a low-μ road surface.

The vehicle turning control device may be configured as follows: the vehicle traveling value information includes at least the yaw rate deviation, the predetermined plurality of control gains include at least first and second control gains $\alpha_1$, $\alpha_2$ which satisfy a magnitude relationship of $\alpha_1 < \alpha_2$, and in the vehicle turning control device, two different yaw rate deviation threshold values that are a first yaw rate deviation threshold value $r_a$ and a second yaw rate deviation threshold value $r_b$ satisfying a magnitude relationship of $r_a < r_b$ are predetermined for the yaw rate deviation, and the target yaw rate correction module 32 or the yaw moment correction module 33 when the yaw rate deviation is smaller than the first yaw rate deviation threshold value $r_a$, uses the target yaw rate calculated by the plural-target-yaw-rate calculation module 25 or the yaw moment calculated by the plural-yaw-moment calculation module 27 with respect to the second control gain $\alpha_2$, as the target yaw rate with respect to the control gain calculated by the control gain calculation module 26, when the yaw rate deviation is greater than the second yaw rate deviation threshold value $r_b$, uses the target yaw rate calculated by the plural-target-yaw-rate calculation module 25 or the yaw moment calculated by the plural-yaw-moment calculation module 27 with respect to the first control gain $\alpha_1$, as the target yaw rate with respect to the control gain calculated by the control gain calculation module 26, and when the yaw rate deviation is greater than the first yaw rate deviation threshold value $r_a$ and smaller than the second yaw rate deviation threshold value $r_b$, uses the target yaw rate approximated with the interpolation, as the target yaw rate with respect to the control gain calculated by the control gain calculation module 26.

The vehicle turning control device may be configured as follows: the vehicle traveling value information includes at least the yaw rate deviation, the predetermined plurality of control gains include at least first and second control gains $\alpha_1$, $\alpha_2$ which satisfy a magnitude relationship of $\alpha_1 < \alpha_2$, and in the vehicle turning control device, two different yaw rate deviation threshold values that are a first yaw rate deviation threshold value $r_a$ and a second yaw rate deviation threshold value $r_b$ satisfying a magnitude relationship of $r_a < r_b$ are predetermined for the yaw rate deviation, and the yaw moment correction module
when the yaw rate deviation is smaller than the first yaw rate deviation threshold value $r_a$, uses the yaw moment calculated by the plural-yaw-moment calculation module with respect to the second control gain $\alpha_2$, as the yaw moment with respect to the control gain calculated by the control gain calculation module,
when the yaw rate deviation is greater than the second yaw rate deviation threshold value $r_b$, uses the yaw moment calculated by the plural-yaw-moment calculation module with respect to the first control gain $\alpha_1$, as the yaw moment with respect to the control gain calculated by the control gain calculation module, and
when the yaw rate deviation is greater than the first yaw rate deviation threshold value $r_a$ and smaller than the second yaw rate deviation threshold value $r_b$, uses the approximated yaw moment with the interpolation, as the yaw moment with respect to the control gain calculated by the control gain calculation module.

Causing the yaw response characteristic to approach the basic yaw response characteristic as the yaw rate deviation increases as in the above configuration enables the vehicle attitude to immediately recover from a plow or spin tendency.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

FIG. 13A is a schematic diagram showing an example of a driving method for a four-wheel drive vehicle using an internal combustion engine as a driving source in the case where a yaw moment is generated in such a direction as to improve turning performance when the vehicle turns left;

FIG. 13B is a schematic diagram showing another example of a driving method for a front-wheel drive vehicle using an internal combustion engine as a driving source in the case where a yaw moment is generated in such a direction as to improve turning performance when the vehicle turns left; and FIG. 13C is a schematic diagram showing still another example of a driving method for a rear-wheel drive vehicle using an internal combustion engine as a driving source in the case where a yaw moment is generated in such a direction as to improve turning performance when the vehicle turns left.

DESCRIPTION OF EMBODIMENTS

Figure 1:
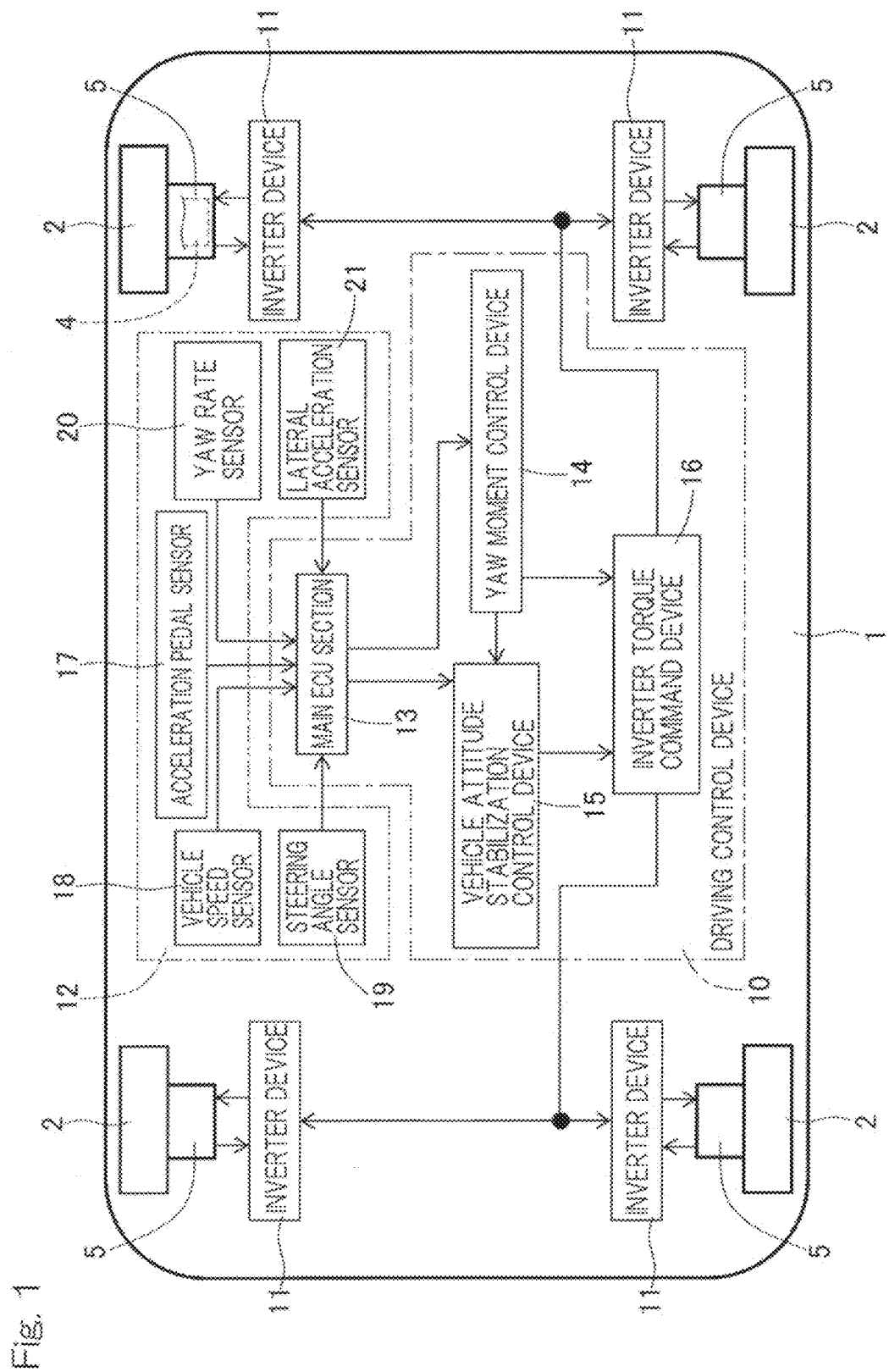
FIG. 1 is a system configuration diagram showing the conceptual configuration of a vehicle turning control device according to the first embodiment of the present invention.

A vehicle turning control device according to the first embodiment of the present invention will be described with reference to FIGS. 1 to 10. As shown in FIG. 1, an example in which a vehicle 1 provided with the turning control device is a vehicle of four-wheel independent driven type having in-wheel motor driving devices (hereinafter, may be abbreviated as "IWM") 5 for all four wheels, will be described. In this vehicle 1, right and left rear wheels 2, 2 and right and left front wheels 2, 2 are independently driven by corresponding electric motors 4 as braking/driving sources in the respective in-wheel motor driving devices 5.

Figure 2:
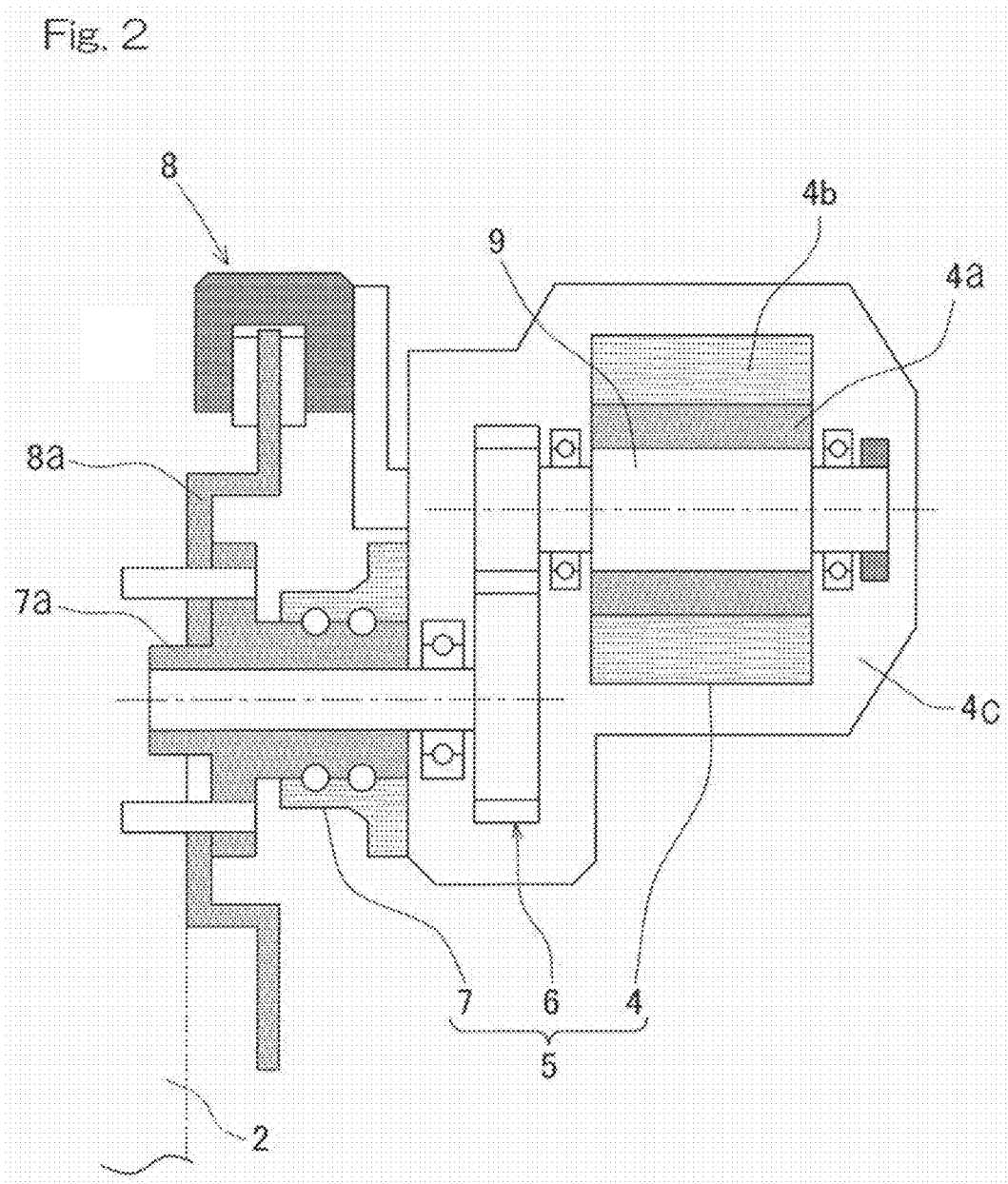
FIG. 2 is a longitudinal sectional view showing an example of an in-wheel motor driving device for a vehicle shown in FIG. 1.

As shown in FIG. 2, each in-wheel motor driving device 5 has the electric motor 4, a speed reducer 6, and a wheel bearing 7, and these are partially or entirely provided inside the wheel 2. Rotation of the electric motor 4 is transmitted to the wheel 2 via the speed reducer 6 and the wheel bearing 7. The in-wheel motor driving device 5 generates a driving torque or a braking torque by switching of the rotation direction of the electric motor 4. A brake rotor 8a composing a frictional brake device 8 is fixed to a flange portion of a hub ring 7a of the wheel bearing 7. The brake rotor 8a rotates integrally with the wheel 2. The electric motor 4 is, for example, an interior magnet permanent magnet synchronous motor, having permanent magnets embedded in a core portion of a rotor 4a. The electric motor 4 is a motor in which a radial gap is provided between a stator 4b, fixed to a housing 4c, and the rotor 4a, attached to a rotary output shaft 9.

In FIG. 1, a control system will be described. The turning control device of the vehicle 1 includes: a driving control device 10, which is implemented by an electric control unit (ECU) in this embodiment; a plurality of (in this example, four) inverter devices 11, provided for the respective electric motors 4; and sensors 12. The driving control device 10 includes a main ECU section 13, a yaw moment control device 14, a vehicle attitude stabilization control device 15, and an inverter torque command device 16. The driving control device 10 is implemented by a computer such as a microcomputer, a program executed by the computer, various electronic circuits, and the like. The driving control device 10 and the inverter devices 11 are connected to each other via an in-vehicle communication network such as control area network (CAN).

The main ECU section 13 has, as a basic configuration thereof, a function for performing integrated control and cooperative control for the entire vehicle, and a braking/driving command generation function. The braking/driving command generation function is a function of generating a torque command value to be distributed to the respective electric motors 4, from an acceleration command value which is a command value of operation amount detected by an acceleration pedal sensor 17 provided to an acceleration pedal (not shown). When the driver operates the acceleration pedal to command for driving, the acceleration command value is supplied from the acceleration pedal sensor 17 to the main ECU section 13 in accordance with the operation amount of the acceleration pedal. The acceleration pedal is included in the "operation mechanism". More specifically, the braking/driving command generation function of the main ECU section 13 is defined as a function of generating a total torque command value to be distributed to the respective four electric motors 4, by subtracting, from the acceleration command value, a brake command value. The brake command value is equivalent to an operation amount detected by a brake pedal sensor provided to a brake pedal (not shown). It is noted that, the "operation mechanism" may be an autonomous driving device in a car with such an autonomous driving device (not shown).

An acceleration torque command value from the main ECU section 13 is sent to each inverter device 11 via the yaw moment control device 14 and the like. Each inverter device 11 is configured so as to convert DC power of a battery (not shown) to AC power for driving the electric motor 4, and has a control unit (not shown) for controlling the output thereof, thereby controlling the corresponding electric motor 4 in accordance with the torque command value distributed for each wheel 2. Each inverter device 11 includes a power circuit unit (not shown) such as a bridge circuit of switching elements for performing conversion to AC power, and a control unit (not shown) for controlling the power circuit unit.

The sensors 12 include the acceleration pedal sensor 17, a vehicle speed sensor (vehicle speed detector) 18 for detecting the vehicle speed, a steering angle sensor (steering angle detector) 19 for detecting the steering angle, a yaw rate sensor (yaw rate detector) 20 for detecting the yaw rate, and a lateral acceleration sensor (lateral acceleration detector) 21 for detecting the lateral acceleration. The steering angle sensor 19 is, for example, a sensor for detecting the steering angle of a steering wheel or the like (not shown). The steering angle from the steering angle sensor 19, the vehicle speed from the vehicle speed sensor 18, the actual lateral acceleration from the lateral acceleration sensor 21, and the actual yaw rate from the yaw rate sensor 20 are supplied to the main ECU section 13. These values are supplied from the main ECU section 13 to the yaw moment control device 14 and the vehicle attitude stabilization control device 15.

Figure 3:
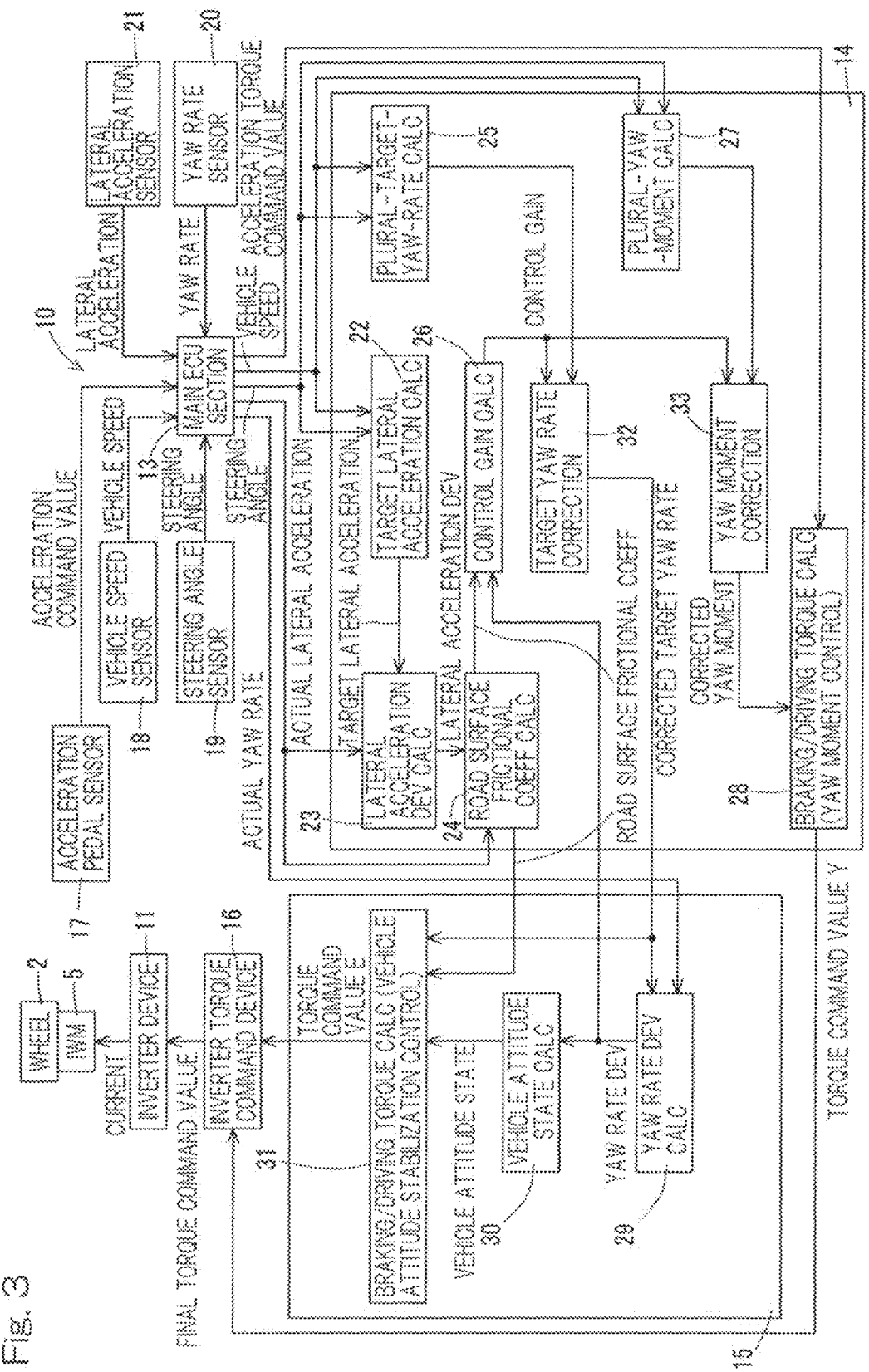
FIG. 3 is a block diagram showing a specific example of a part of the turning control device shown in FIG. 1.

As shown in FIG. 3, the yaw moment control device 14 includes: a target lateral acceleration calculation module 22; a lateral acceleration deviation calculation module 23; a road surface frictional coefficient calculation module 24, serving as a vehicle traveling value information calculation module; a plural-target-yaw-rate calculation module 25; a target yaw rate correction module 32; a control gain calculation module 26; a plural-yaw-moment calculation module 27; a yaw moment correction module 33; and a braking/driving torque calculation module 28. The vehicle attitude stabilization control device 15 includes: a yaw rate deviation calculation module 29, serving as the vehicle traveling value information calculation module; a vehicle attitude state calculation module 30; and a braking/driving torque calculation module 31.

Figure 6:
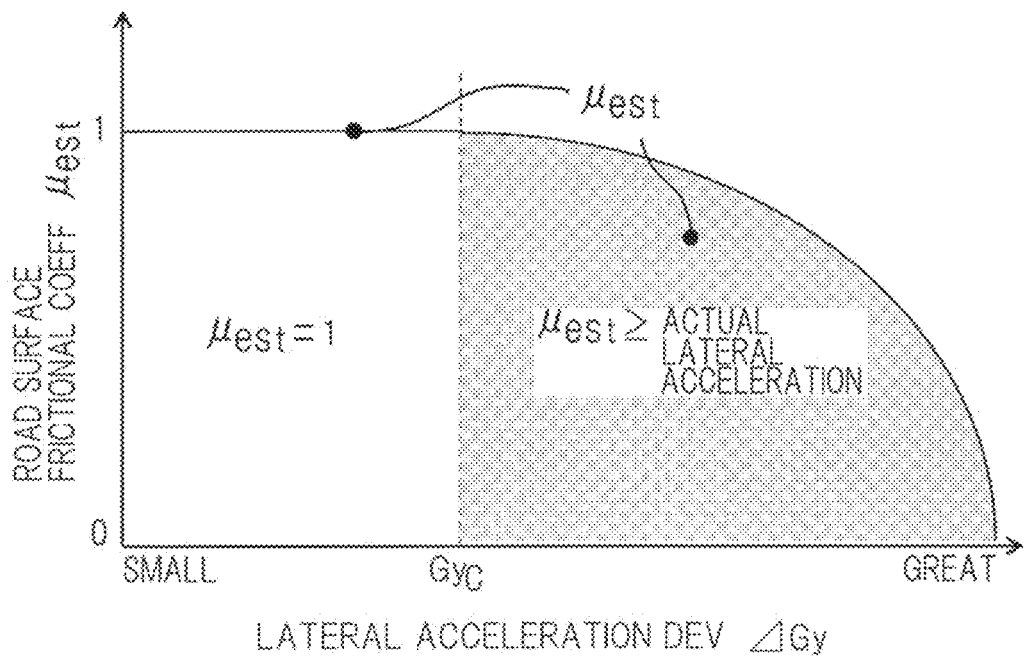
FIG. 6 shows the relationship between a lateral acceleration deviation and a road surface frictional coefficient in the turning control device shown in FIG. 1.
Figure 7:
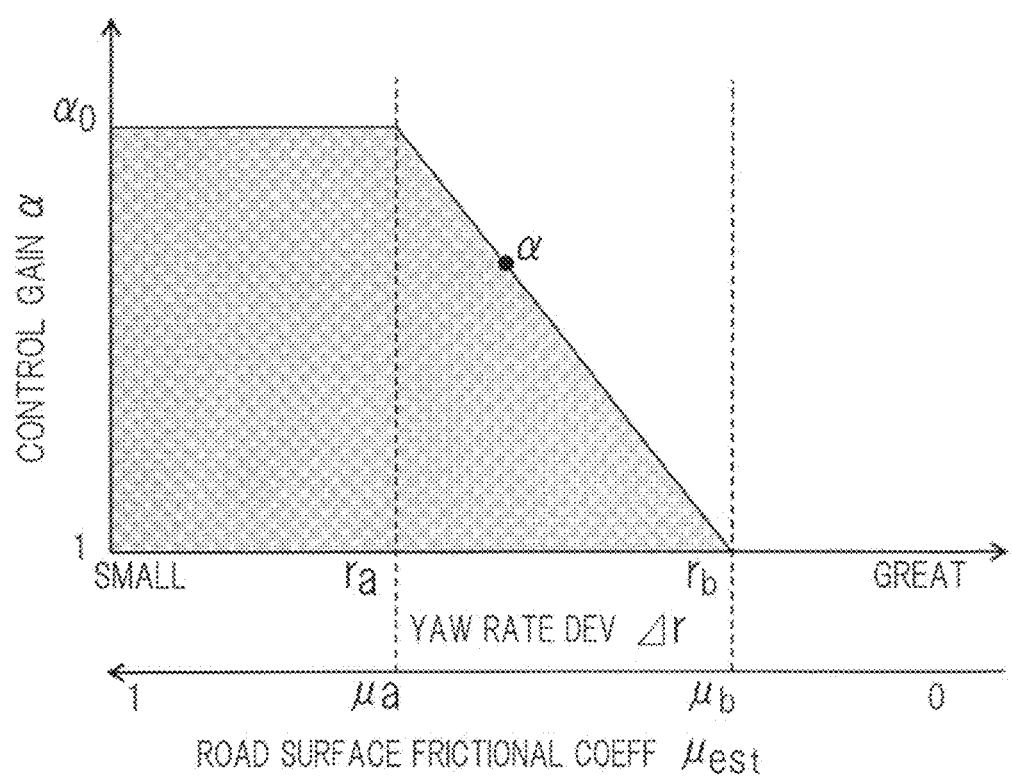
FIG. 7 shows the relationship between the control gain and each of a yaw rate deviation and the road surface frictional coefficient in the turning control device shown in FIG. 1.

The vehicle speed, the steering angle, the actual lateral acceleration, and the acceleration torque command value from the acceleration pedal sensor 17, are supplied from the main ECU section 13 to the yaw moment control device 14. The target lateral acceleration calculation module 22 calculates a target lateral acceleration from the vehicle speed, the steering angle, and vehicle parameters such as vehicle mass and wheelbase. The lateral acceleration deviation calculation module 23 calculates a lateral acceleration deviation, from a difference between the target lateral acceleration and the actual lateral acceleration. As shown in FIG. 6, if the lateral acceleration deviation obtained by the lateral acceleration deviation calculation module 23 is equal to or smaller than one lateral acceleration deviation threshold value $Gy_c$, the road surface frictional coefficient calculation module 24 sets a road surface frictional coefficient $\mu_{est}$ to 1, and if the lateral acceleration deviation is greater than the lateral acceleration deviation threshold value $Gy_c$, the road surface frictional coefficient calculation module 24 calculates the road surface frictional coefficient from the actual lateral acceleration $Gy_{act}$. The following expressions (1) and (2) indicate the relationship shown in FIG. 6.

Here, the target lateral acceleration is defined as $Gy_{ref}$, the actual lateral acceleration is defined as $Gy_{act}$, the road surface frictional coefficient is defined as $\mu_{est}$, the actual lateral acceleration (m/s$^2$) is defined as $G_y$, a front-rear force is defined as Fx, a lateral force is defined as Fy, an up-down force is defined as Fz, the vehicle weight is defined as m, and the gravitational acceleration is defined as g.

$$\text{In an equilibrium expression } (\mu_{est}Fz)^2 = Fx^2 + Fy^2 \qquad (1)'$$

if Fx is equal to 0, the following expression is obtained:

$$\mu_{est}|Fz| = |Fy| \qquad (2)'$$

$$\text{From an expression } |Fy| = m|Gy| \qquad (3)', \text{ and}$$

expression (2)',
the following expression is obtained:

$$\mu_{est}|Fz| = m|Gy| \qquad (4)'.$$

Thus, $\mu_{est}$ is represented as follows:

$$\mu_{est} = |Gy_{act}| = |Gy|/g \qquad (5)'.$$

From the above, the road surface frictional coefficient $\mu_{est}$ is estimated as follows.

$$\text{If } |Gy_{ref}| - |Gy_{act}| \le |Gy_c|, \mu_{est} = 1 \qquad (1)$$

$$\text{If } |Gy_{ref}| - |Gy_{act}| > |Gy_c|, \mu_{est} \ge |Gy_{act}| \qquad (2)$$

In FIG. 3, the plural-target-yaw-rate calculation module 25 calculates a plurality of target yaw rates in advance. A plurality of values calculated using a transfer function of a second-order lag system of a target yaw rate r(s) relative to the actual steering angle δ(s), shown in expression (3), are obtained.

[Mathematical 1]

$$\frac{r(s)}{\delta(s)} = G_\delta^r(0) \frac{(\alpha\omega_n)^2(1+T_r s)}{(\alpha\omega_n)^2 + 2\left(\frac{\zeta}{\lambda}\right)(\alpha\omega_n)s + s^2} \quad (3)$$

In expression (3), Gδ'(0) is a yaw angular velocity gain constant (yaw rate gain constant), $\omega_n$ is a natural frequency in the yaw direction, is an attenuation coefficient in the yaw direction, $T_r$ is a yaw angular velocity time constant (yaw rate time constant), s is the Laplace operator, $\alpha_i$ is a control gain of the natural frequency $\omega_n$ (i=1 to 3), and $\lambda_i$ is a control gain of the attenuation coefficient (i=1 to 3). The yaw angular velocity gain constant Gδ'(0), the natural frequency $\omega_n$ in the yaw direction, the attenuation coefficient ξ in the yaw direction, and the yaw angular velocity time constant Tr are calculated from the vehicle speed and vehicle parameters such as vehicle mass and wheelbase.

Figure 4:
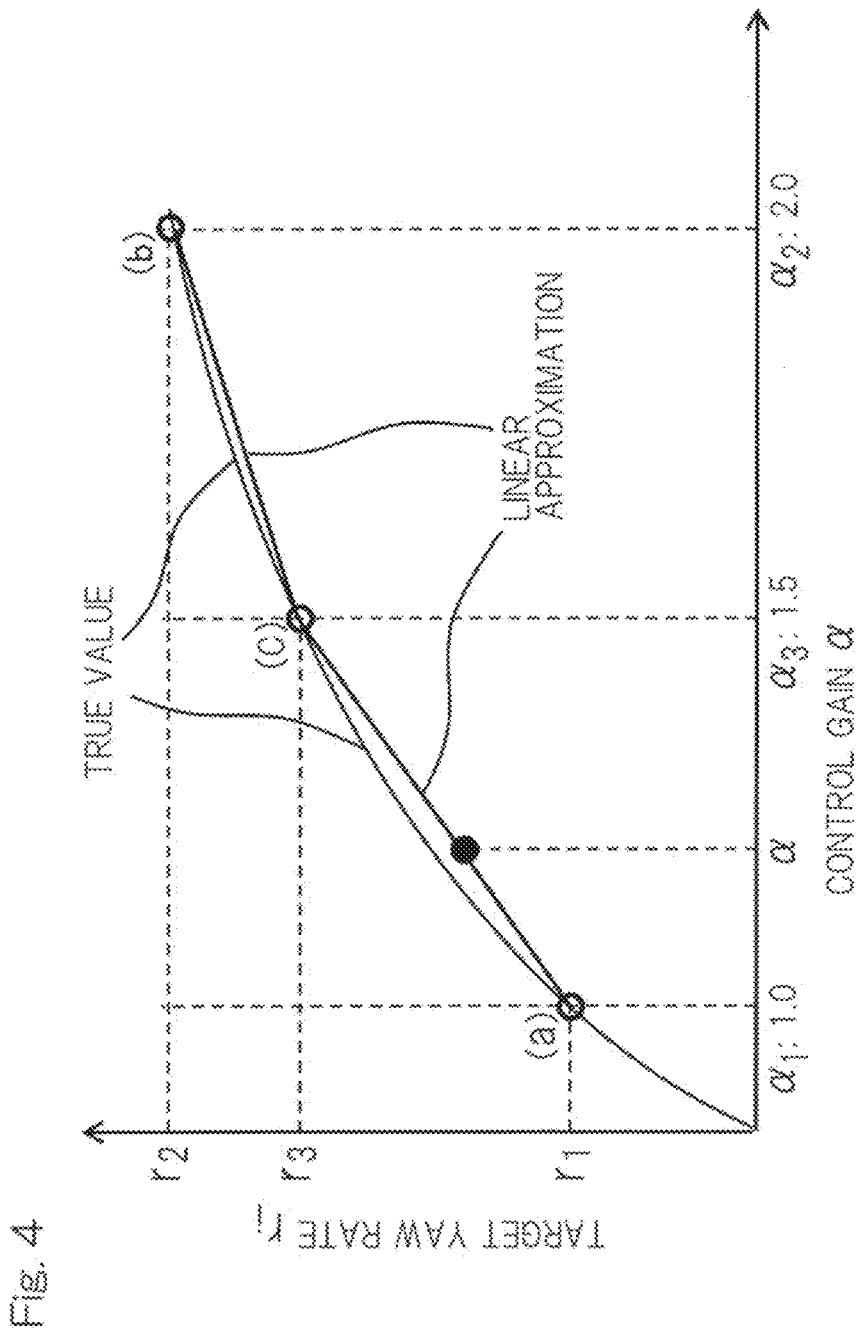
FIG. 4 illustrates linear interpolation of a target yaw rate with respect to a control gain for the turning control device shown in FIG. 1.

When the control gain α of the natural frequency $\omega_n$ or the control gain λ of the attenuation coefficient is greater than 1, rise time of the target yaw rate becomes shorter (i.e., quick responsiveness for the target yaw rate is enhanced), and when the control gain α and λ is 1, the yaw response characteristic of the vehicle itself (a basic yaw response characteristic) is obtained. As an example, as shown in FIG. 4, in the case where three control gain values are specified in advance, for example, the initial value $\alpha_2$ of the control gain is set at 2.0, the target yaw rates with respect to the control gains of (a) $\alpha_1$=1.0, (b) $\alpha_2$=2.0, and (c) $\alpha_3$=1.5 are calculated in advance, using the transfer function of the second-order lag system. For example, the value of the right-hand side of the transfer function of the second-order lag system is calculated for the three values of the control gain and a plurality of vehicle speeds, and then stored in a lookup table so as to be associated with these values. In yaw moment control, by referring to the lookup table for a certain control gain and a certain vehicle speed, the value of the right-hand side of the transfer function of the second-order lag system is obtained. Therefore, it is possible to calculate the target yaw rate r(s) for the actual steering angle δ(s).

The target yaw rate correction module 32 calculates a resultant target yaw rate (final target yaw rate) to be obtained, from the target yaw rates (calculated target yaw rates) calculated by the plural-target-yaw-rate calculation module 25 and the control gains calculated by the control gain calculation module 26. For example, in the case where the initial value $\alpha_2$ is set at 2.0 first and then the control gain changes from 2.0 to 1.0 through calculation by the control gain calculation module 26, a target yaw rate with respect to a control gain between $\alpha_1$ and $\alpha_3$ or between $\alpha_3$ and $\alpha_2$ is approximated by linear interpolation. In this way, the yaw response characteristic of the vehicle is caused to smoothly approach the yaw response characteristic of the vehicle itself. In this embodiment, as the interpolation method, linear interpolation has been shown as an example. However, the interpolation method is not limited thereto. That is, as the interpolation method, another known interpolation method, such as polynomial interpolation, spline interpolation, or Lagrange interpolation, may be used.

Figure 11:
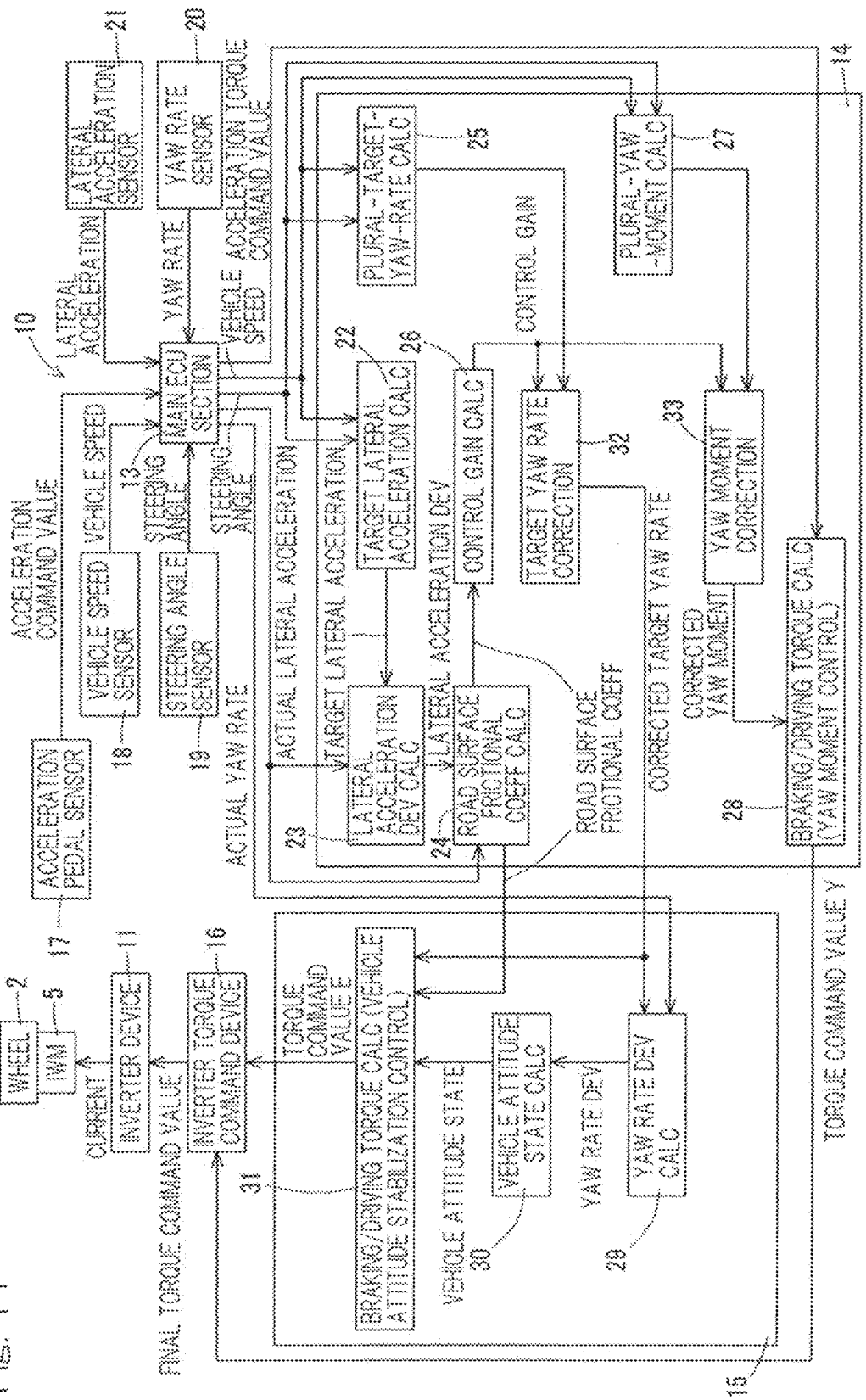
FIG. 11 is a block diagram showing a specific example of a part of a vehicle turning control device according to the second embodiment of the present invention.
Figure 12:
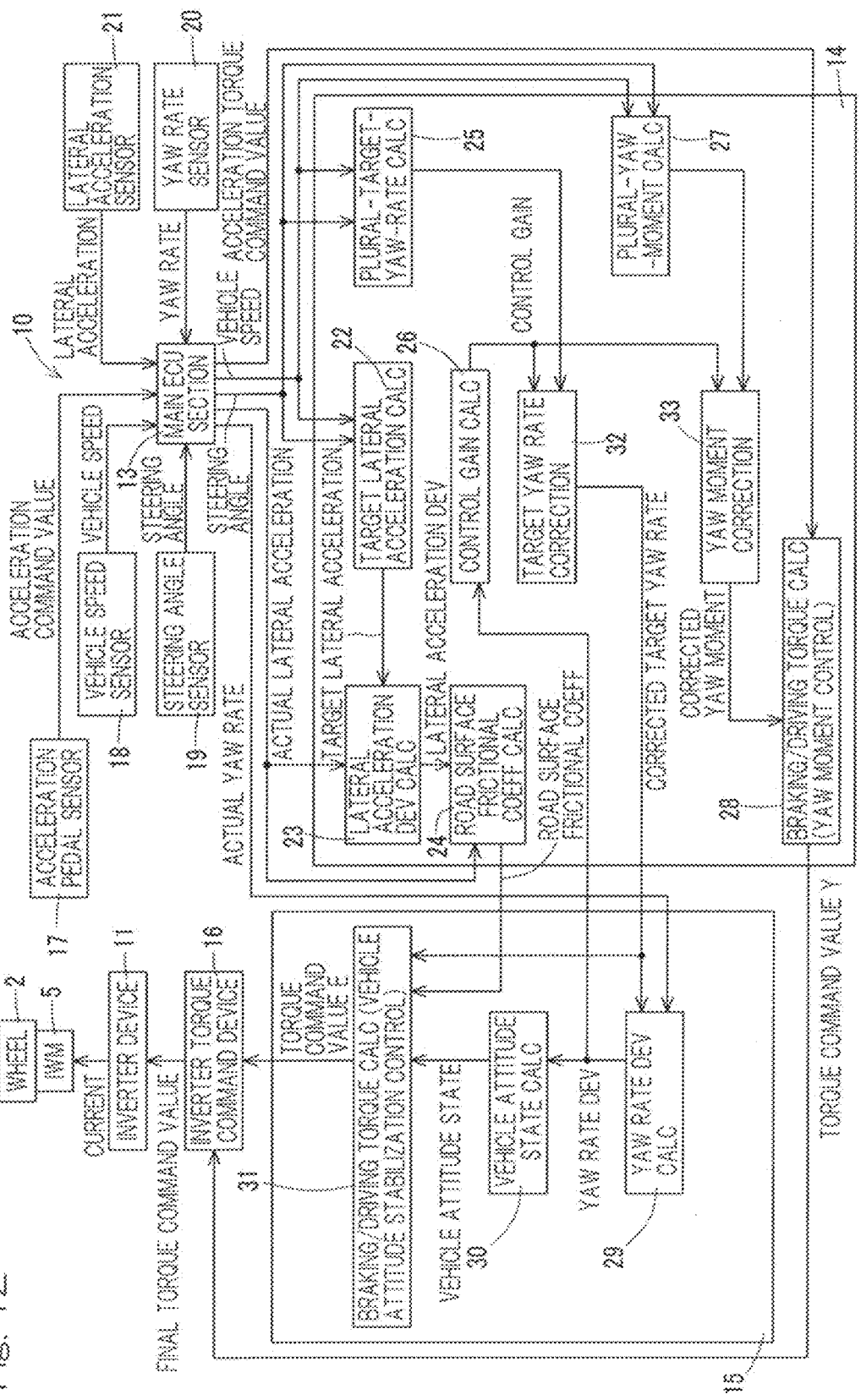
FIG. 12 is a block diagram showing a specific example of a part of a vehicle turning control device according to the third embodiment of the present invention.

The control gain calculation module 26 calculates the control gains α, λ in accordance with the road surface frictional coefficient calculated by the road surface frictional coefficient calculation module 24, which is one of the vehicle traveling information values, and the yaw rate deviation calculated by the yaw rate deviation calculation module 29, which is another one of the vehicle traveling information values. It is noted that the control gain calculation module 26 may calculate the control gains on the basis of only the road surface frictional coefficient calculated by the road surface frictional coefficient calculation module 24, as shown in the second embodiment in FIG. 11. That is, the control gains may be calculated without using the yaw rate deviation. Alternatively, as shown in the third embodiment in FIG. 12, the control gains may be calculated on the basis of only the yaw rate deviation calculated by the yaw rate deviation calculation module 29. That is, the control gains may be calculated without using the road surface frictional coefficient. The other configurations in the embodiments shown in FIG. 11 and FIG. 12 are the same as in the embodiment shown in FIG. 3.

Regarding the control gains, as described above, the control gain of the natural frequency $\omega_n$ in the yaw direction is a, and the control gain of the attenuation coefficient in the yaw direction is 2. Regarding all the control gains mentioned hereafter, description will be given using the control gain α as an example. For the road surface frictional coefficient or the yaw rate deviation, two threshold values may be provided as shown FIG. 7. If the road surface frictional coefficient becomes smaller than the first road surface frictional coefficient threshold value $\mu_a$ or the yaw rate deviation becomes greater than the first yaw rate deviation threshold value $r_a$, the control gain calculation module 26 causes the control gain α to approach 1 from the initial value. That is, the control gain calculation module 26 sets and maintains a value calculated by $\alpha=-((\alpha_0-1)/(r_b-r_a)(r-r_a)+\alpha_0$ or $\alpha=-((\alpha_0-1)/(\mu_b-\mu_a))(\mu-\mu_a)+\alpha_0$, as the control gain α. On the other hand, if the road surface frictional coefficient becomes smaller than the second road surface frictional coefficient threshold value $\mu_b$ or the yaw rate deviation becomes greater than the second yaw rate deviation threshold value $r_b$, the control gain calculation module 26 causes the control gain α to approach the initial value $\alpha_0$ from 1. Here, as described later, the amount of change in the control gain α per time when the control gain α is returned from 1 to the initial value $\alpha_0$ is small, and therefore the control gain calculation module 26 sets and maintains a value calculated by $\alpha=-((\alpha_0-1)/(r_b-r_c))(r-r_c)+\alpha_0$ or a value calculated by $\alpha=-((\alpha_0-1)/(\mu_b-\mu_c)+\alpha_0$, as the control gain α (here, the yaw rate deviation value $r_c$ satisfies $r_c>r_a$, and the road surface frictional coefficient value $\mu_c$ satisfies $\mu_c<\mu_a$). If the road surface frictional coefficient is smaller than the second road surface frictional coefficient threshold value $\mu_b$ or the yaw rate deviation is greater than the second yaw rate deviation threshold value $r_b$, the control gain calculation module 26 sets and maintains the control gain α at 1.

Figure 8:
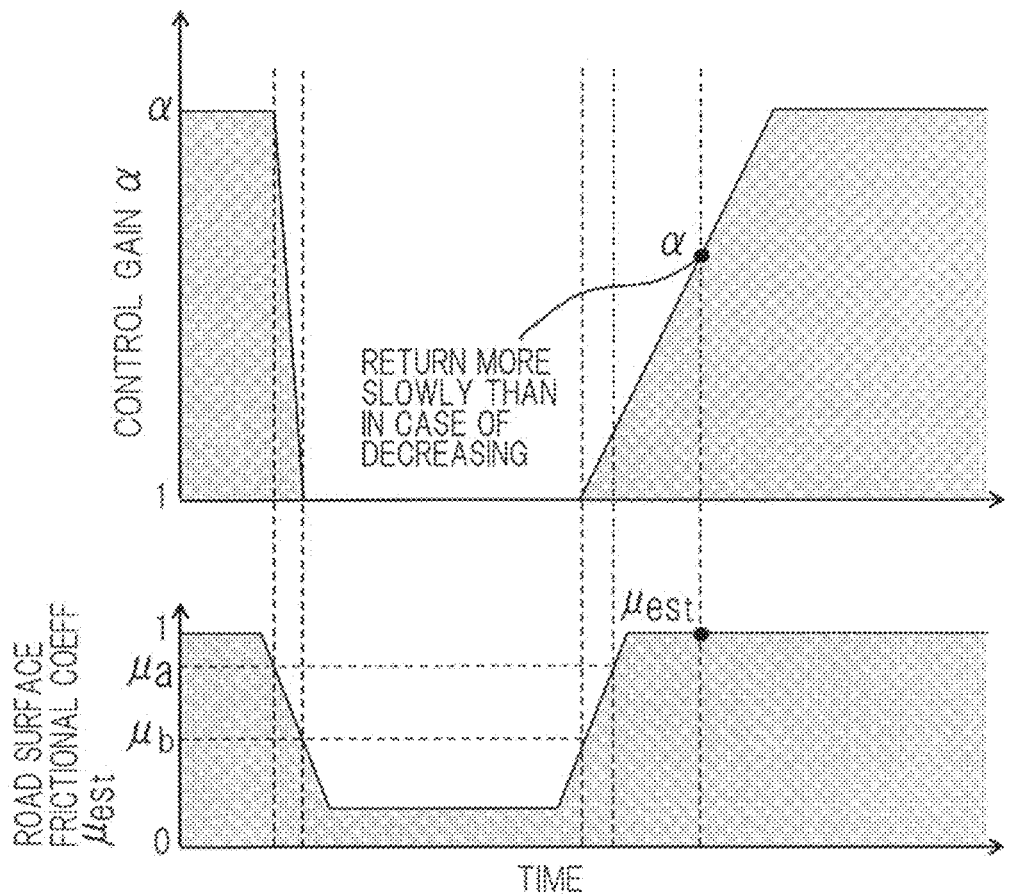
FIG. 8 shows an example of transition of the control gain in the turning control device shown in FIG. 1.

That is, as shown in FIG. 8, when the control gain is returned from 1 to the initial value, the control gain changes more gradually than when the control gain is decreased from the initial value to 1. At a place with a low road surface frictional coefficient, the tire grip force is likely to be lost, and therefore the control gain is immediately reduced, to decrease the braking/driving torque in the yaw moment control, and at a place with a high road surface frictional coefficient, the tire grip force is restored, and therefore the control gain is gradually returned to the initial value, thereby increasing the braking/driving torque in the yaw moment control. Thus, no uncomfortable feeling is given to the driver.

In FIG. 3, the plural-yaw-moment calculation module 27 calculates a plurality of yaw moments in advance. A plurality of values calculated using a transfer function of a third-order lag system of a yaw moment $M_z(s)$ relative to the actual steering angle $\delta(s)$, shown in expression (4), are obtained.

[Mathematical 2]

$$\frac{M_Z(s)}{\delta(s)} = \frac{G_\delta^r(0)\dfrac{(\alpha\omega_n)^2(1+T_r s)}{(\alpha\omega_n)^2 + 2\left(\dfrac{\zeta}{\lambda}\right)(\alpha\omega_n)s + s^2} - G_\delta^r(0)\dfrac{\omega_n^2(1+T_r s)}{\omega_n^2 + 2\zeta\omega_n s + s^2}}{G_M^r(0)\dfrac{\omega_n^2(1+T_M s)}{\omega_n^2 + 2\zeta\omega_n s + s^2}} \quad (4)$$

In expression (4), $G\delta^r(0)$ is the yaw angular velocity gain constant (yaw rate gain constant), $\omega_n$ is the natural frequency in the yaw direction, is the attenuation coefficient in the yaw direction, $T_r$ is the yaw angular velocity time constant (yaw rate time constant), $GM^r(0)$ is the yaw moment gain constant, $T_M$ is a yaw moment time constant, s is the Laplace operator, $\alpha_i$ is the control gain of the natural frequency $\omega_n$ (i=1 to 3), and $\lambda_i$ is the control gain of the attenuation coefficient (i=1 to 3). As in expression (3), the yaw angular velocity gain constant $G\delta^r(0)$, the natural frequency $\omega_n$ in the yaw direction, the attenuation coefficient $\xi$ in the yaw direction, the yaw angular velocity time constant Tr, the yaw moment gain constant $GM^r(0)$, and the yaw moment time constant $T_M$ are calculated from the vehicle speed and vehicle parameters such as vehicle mass and wheelbase.

Figure 5:
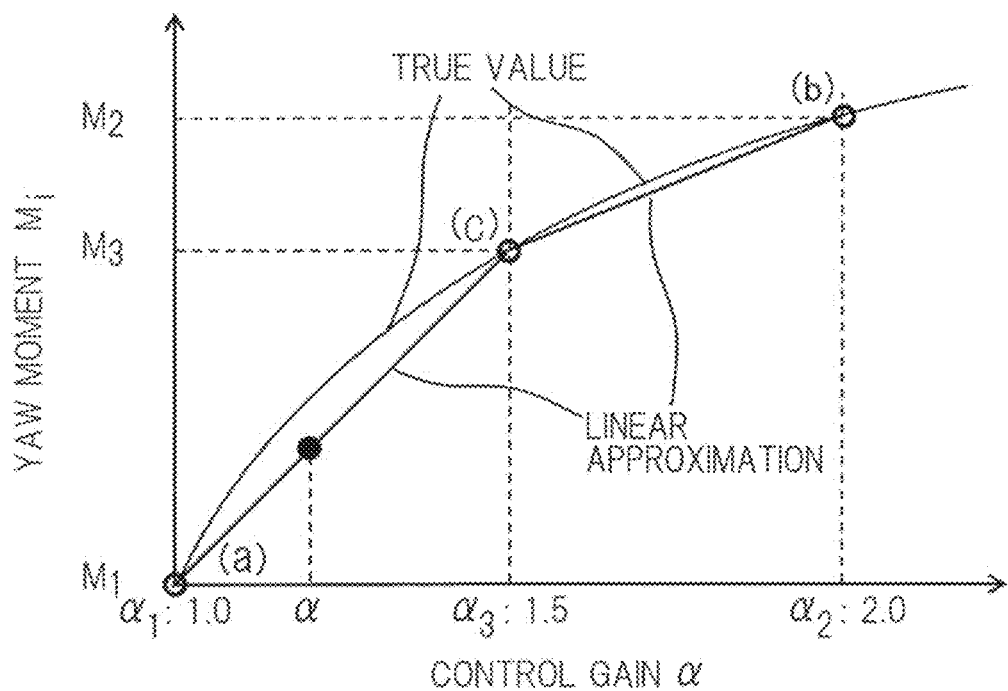
FIG. 5 illustrates linear interpolation of a yaw moment with respect to a control gain for the turning control device shown in FIG. 1.

As in the plural-target-yaw-rate calculation module 25, as an example, as shown in FIG. 5, in the case where three control gain values are specified in advance, for example, the initial value $\alpha_2$ of the control gain is set at 2.0, the yaw moments with respect to the control gains of (a) $\alpha_1$=1.0, (b) $\alpha_2$=2.0, and (c) $\alpha_3$=1.5 are calculated in advance, using the transfer function of the third-order lag system. For example, the value of the right-hand side of the transfer function of the third-order lag system is calculated for the three values of the control gain and a plurality of vehicle speeds, and then stored in a lookup table so as to be associated with these values. In yaw moment control, by referring to the lookup table for a certain control gain and a certain vehicle speed, the value of the right-hand side of the transfer function of the third-order lag system is obtained. Therefore, it is possible to calculate the yaw moment $M_z(s)$ for the actual steering angle $\delta(s)$. It is noted that, with reference to expression (4), it is found that the yaw moment $M_z(s)$ relative to the actual steering angle $\delta(s)$ is zero when the control gains $\alpha_1$ and $\lambda_i$ are 1.0.

The yaw moment correction module 33 calculates a resultant yaw moment (final yaw moment) to be outputted, from the yaw moments (calculated yaw moments) calculated by the plural-yaw-moment calculation module 27 and the control gains calculated by the control gain calculation module 26. For example, as described above, in the case where the initial value $\alpha_2$ of the control gain is set at 2.0 first and then the control gain changes from 2.0 to 1.0 through calculation by the control gain calculation module 26, a target yaw rate with respect to a control gain between $\alpha_1$ and $\alpha_3$ or between $\alpha_3$ and $\alpha_2$ is approximated by linear interpolation. In this way, the yaw moment is caused to smoothly approach zero. In this embodiment, as the interpolation method, linear interpolation has been shown as an example. However, the interpolation method is not limited thereto. That is, as the interpolation method, another known interpolation method, such as polynomial interpolation, spline interpolation, or Lagrange interpolation, may be used.

On the basis of the acceleration torque command value and the yaw moment calculated by expression (4), the braking/driving torque calculation module 28 determines the braking/driving torques for the four wheels, and issues a torque command value Y. When no vehicle attitude stabilization control is performed, the torque command value Y is used as a final command torque.

The vehicle turning control device performing the yaw moment control described-above can be provided not only in a four-wheel IWM vehicle described in this embodiment but also in other types of vehicle, such as a front-wheel drive vehicle, a rear-wheel drive vehicle, and a four-wheel drive vehicle using gasoline as a driving source, in which friction brakes are used as means for applying braking torques to four wheels at right and left on the front side and the rear side.

FIG. 9 and FIGS. 13A to 13C show, for the respective driving types, methods for generating a yaw moment in such a direction as to improve turning performance when equal driving torques are applied to the right and left wheels in the vehicle turning left. Broken-line thin arrows indicate braking torqued by the IWM or the friction brake (not shown), solid-line thin arrows indicate driving torques by the IWM or engine output. Thick arrows indicate a total value of a braking torque and a driving torque, specifically, solid line thick arrows indicate a total value of driving torques, and broken line thick arrows indicate a total value of braking torques.

Figure 9:
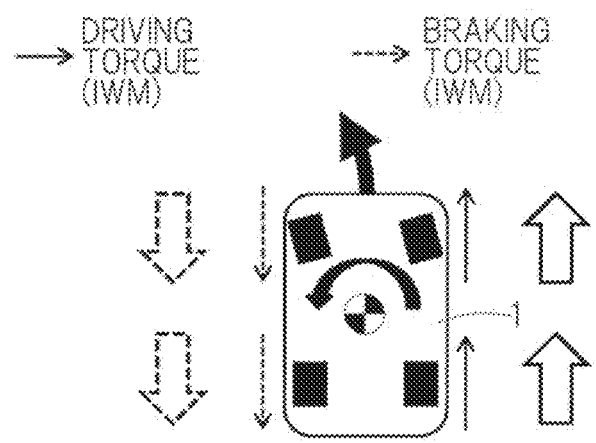
FIG. 9 shows an example in which a yaw moment is generated in such a direction as to improve turning performance, when the vehicle shown in FIG. 1 turns left.

As shown in FIG. 9, in the IWM-mounted vehicle, a yaw moment is generated by driving torques applied to the turning outer wheels and braking torques applied to the turning inner wheels. As shown in FIGS. 13A to 13C, in the gasoline engine vehicle, a yaw moment is generated by driving torques from engine output for the turning outer wheels, and braking torques from friction brakes greater than the driving torques, for the turning inner wheels. When the driver performs an accelerating operation or a braking operation during turning of the vehicle, a braking torque or a driving torque is applied and therefore the vehicle is accelerated or decelerated.

In FIG. 3, the actual yaw rate is supplied from the main ECU section 13 to the vehicle attitude stabilization control device 15. The yaw rate deviation calculation module 29 calculates the yaw rate deviation, from a difference between the actual yaw rate and the corrected target yaw rate (final target yaw rate), which is corrected by the target yaw rate correction module 32.

The vehicle attitude state calculation module 30 calculates the attitude state of the vehicle from the magnitude of the yaw rate deviation calculated by the yaw rate deviation calculation module 29.

Figure 10:
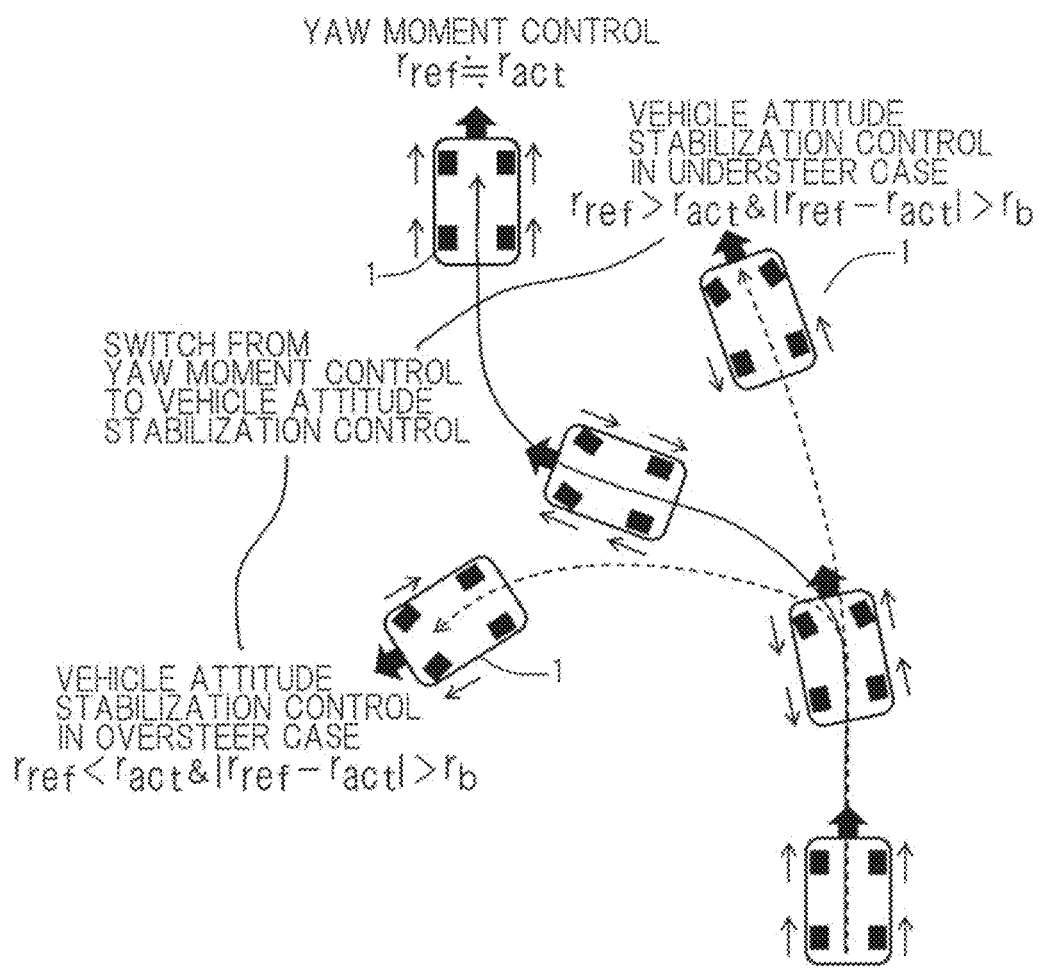
FIG. 10 shows three states of the attitude of the vehicle shown in FIG. 1.

FIG. 10 shows three states of the vehicle attitude. In the case where the target yaw rate and the actual yaw rate are substantially equal to each other, a command is issued through yaw moment control so as to generate braking torques or driving torques in the same direction for the front and rear wheels on one side, thereby generating a yaw moment. On the other hand, at a place with a low road surface frictional coefficient, or the like, it is likely that the vehicle fails to take a curve, or spins. Where the target yaw rate is $r_{ref}$, the actual yaw rate is $r_{act}$, and the yaw rate threshold value is $r_b$, determination is performed as follows.

Understeer state, if $r_{ref} > r_{act}$ and $|r_{ref} - r_{act}| > r_b$ \quad (5)

Oversteer state, if $r_{ref} < r_{act}$ and $|r_{ref} - r_{act}| > r_b$ \quad (6)

A yaw moment is generated using the rear wheels as control wheels in the case of understeer state or using the front wheels as control wheels in the case of oversteer state, whereby the vehicle attitude is stabilized.

The braking/driving torque calculation module 31 in the vehicle attitude stabilization control calculates a braking torque and a driving torque to be commanded, on the basis of the road surface frictional coefficient calculated by the road surface frictional coefficient calculation module 24, the vehicle attitude state calculated by the vehicle attitude state calculation module 30, and the final target yaw rate corrected by the target yaw rate correction module 32, so that the calculated values are issued as a torque command value E.

The torque command value Y and the torque command value E are supplied to the inverter torque command device 16, which calculates final torque command values. The inverter torque command device 16 issues the final torque command values calculated from the torque command value Y and the torque command value E, to the respective inverter devices 11. Each inverter device 11 controls current so as to achieve the final torque command value, thereby driving the in-wheel motor driving device 5.

In the above configuration, the control gain is caused to approach 1 from the initial value. That is, the yaw moment control, which improves the vehicle turning performance, is changed back to the inherent turning performance of the vehicle. Even so, the vehicle attitude is stabilized while avoiding an undesired yaw moment. Further, in the case where the vehicle is provided with a vehicle attitude stabilization control function, in addition to the above, the target yaw rate used in the yaw moment control may be also used for the vehicle attitude stabilization control, whereby uncomfortable feeling is prevented from being given to the driver no matter how the yaw moment control is switched to the vehicle attitude stabilization control. Hereinafter, this will be specifically described.

In the yaw moment control by the yaw moment control device 14, in accordance with the vehicle speed and the steering angle of the traveling vehicle and the target yaw rate calculated from the control gain, a command value of braking torques or driving torques for the wheels at right and left on the front side and the rear side is issued to generate a yaw moment. Maintaining the target yaw rate in advance so as to be obtained faster than using the yaw response characteristic of the vehicle itself enables the yaw moment to be increased accordingly.

As the control gains that determine the target yaw rate and the yaw moment, a plurality of values are specified in advance. For example, in the case where three control gains are specified, the control gain for the yaw response characteristic of the vehicle itself is defined as $\alpha_1$, the control gain for an initial yaw response characteristic is defined as $\alpha_2$, and one control gain between $\alpha_1$ and $\alpha_2$ is defined as $\alpha_3$. Then, the target yaw rate and the yaw moment when the control gain is $\alpha_1$ are respectively defined as $r_1$ and $M_1$, the target yaw rate and the yaw moment when the control gain is $\alpha_2$ are respectively defined as $r_2$ and $M_2$, and the target yaw rate and the yaw moment when the control gain is $\alpha_3$ are respectively defined as $r_3$ and $M_3$.

When the estimated value of the road surface frictional coefficient is greater than the first road surface frictional coefficient threshold value $\mu_a$ or the yaw rate deviation is smaller than the first yaw rate deviation threshold value $r_a$, the second target yaw rate $r_2$ is used as the target yaw rate and $M_2$ is used as the yaw moment. Here, the second target yaw rate $r_2$ has such a magnitude that causes faster response than using the yaw response characteristic of the vehicle itself. When the estimated value of the road surface frictional coefficient is smaller than the second road surface frictional coefficient threshold value $\mu_b$ or the yaw rate deviation is greater than the second yaw rate deviation threshold value $r_b$, the first target yaw rate $r_1$ is used as the target yaw rate and $M_1$ is used as the yaw moment. Here, the first target yaw rate $r_1$ has such a magnitude that causes response that is almost equal to the yaw response characteristic of the vehicle itself. When the estimated value of the road surface frictional coefficient is smaller than the first road surface frictional coefficient threshold value $\mu_a$ and greater than the second road surface frictional coefficient threshold value $\mu_b$, or when the yaw rate deviation is greater than the first yaw rate deviation threshold value $r_a$ and smaller than the second yaw rate deviation threshold value $r_b$, and when the control gain is between $\alpha_1$ and $\alpha_3$ or between $\alpha_3$ and $\alpha_2$, the target yaw rate and the yaw moment are approximated by interpolation. In this way, the yaw response characteristic is caused to smoothly approach the yaw response characteristic of the vehicle itself from the initial yaw response characteristic.

In the vehicle attitude stabilization control by the vehicle attitude stabilization control device 15, the same target yaw rate as that used in the yaw moment control is used. Therefore, even if the yaw moment control is switched to the vehicle attitude stabilization control, the vehicle turning characteristic with respect to steering does not change and thus no uncomfortable feeling is given to the driver.

The road surface frictional coefficient is estimated from the lateral acceleration measured by the lateral acceleration sensor 21, and the like. If a deviation between the target lateral acceleration calculated from the vehicle speed and the steering angle of the traveling vehicle and the actual lateral acceleration measured by the lateral acceleration sensor 21 is equal to or smaller than the lateral acceleration deviation threshold value $Gy_c$, the road surface frictional coefficient is estimated to be 1. If the deviation is greater than the lateral acceleration deviation threshold value $Gy_c$, the road surface frictional coefficient is estimated from the actual lateral acceleration at that time.

As described above, the vehicle turning control device of the embodiment stabilizes the vehicle by considering a tire grip limit. For example, in the case where yaw moment control for improving turning performance is performed while a vehicle travels on the road with a low road surface frictional coefficient, the yaw moment is controlled such that the tire grip does not exceed the limit, thereby stabilizing the vehicle. In addition, even if the control gain is changed in accordance with the magnitude of the yaw rate deviation or the road surface frictional coefficient during turning, an undesired yaw moment due to the yaw moment control is avoided. Thus turning performance is improved while preventing the target yaw rate from being unstable. Even if the yaw moment control is switched to the vehicle behavior stabilization control, the vehicle turning characteristic with respect to steering is not changed between before and after the switching, and therefore no uncomfortable feeling is given to the driver.

Although the present invention has been described above in connection with the preferred embodiments with reference to the accompanying drawings, numerous additions, changes, or deletions can be made without departing from the gist of the present invention. Accordingly, such additions, changes, or deletions are to be construed as included in the scope of the present invention.

REFERENCE NUMERALS

1 . . . vehicle
2 . . . wheel
4 . . . electric motor (braking/driving source)
18 . . . vehicle speed sensor (vehicle speed detector)
19 . . . steering angle sensor (steering angle detector)
20 . . . yaw rate sensor (yaw rate detector)
24 . . . road surface frictional coefficient calculation module (vehicle traveling value information calculation module)
25 . . . plural-target-yaw-rate calculation module
26 . . . control gain calculation module
29 . . . yaw rate deviation calculation module (vehicle traveling value information calculation module)
32 . . . target yaw rate correction module

What is claimed is:

1. A vehicle turning control device for controlling a turning characteristic of a vehicle, the vehicle including: braking/driving sources for independently controlling braking/driving torques, the braking/driving torques being braking torques or a driving torques for respective wheels at right and left on a front side and a rear side; an operation mechanism; a vehicle speed detector for detecting a vehicle speed; a steering angle detector for detecting a steering angle; a yaw rate detector for detecting an actual yaw rate; and a driving controller for distributing a braking/driving command value to each of the braking/driving sources in response to a command from the operation mechanism, the vehicle turning control device comprising:
  a vehicle traveling value information calculation module configured to calculate a vehicle traveling information value including at least one of a yaw rate deviation and a road surface frictional coefficient, the yaw rate deviation being calculated from a difference between a target yaw rate and the actual yaw rate detected by the yaw rate detector, the target yaw rate being calculated with respect to the vehicle speed detected by the vehicle speed detector and the steering angle detected by the steering angle detector;
  a plural-target-yaw-rate calculation module configured to obtain respective target yaw rates with respect to a predetermined plurality of control gains on the basis of a yaw response characteristic;
  a control gain calculation module configured to determine a control gain on the basis of the vehicle traveling information value calculated by the vehicle traveling information calculation module;
  a target yaw rate correction module configured to obtain a target yaw rate with respect to the control gain calculated by the control gain calculation module, using at least one of the plurality of target yaw rates calculated by the plural-target-yaw-rate calculation module;
  a plural-yaw-moment calculation module configured to calculate respective yaw moments with respect to the predetermined plurality of control gains; and
  a yaw moment correction module configured to obtain a yaw moment with respect to the control gain calculated by the control gain calculation module, using at least one of the plurality of yaw moments calculated by the plural-yaw-moment calculation module, wherein
  the control gain calculation module determines the control gain such that, as the road surface frictional coefficient decreases, or as the yaw rate deviation increases, the yaw response characteristic approaches a basic yaw response characteristic from an initial yaw response characteristic,
  on the basis of the yaw moment calculated by the yaw moment correction module, the braking/driving torques for the wheels at right and left on the front side and the rear side are calculated to be outputted,
  the target yaw rate correction module obtains the target yaw rate with respect to the control gain calculated by the control gain calculation module by approximating the target yaw rate with interpolation between two gains having magnitudes next to each other, of the predetermined plurality of control gains, and
  the yaw moment correction module obtains a target yaw moment with respect to the control gain calculated by the control gain calculation module by approximating the target yaw moment with interpolation between two gains having magnitudes next to each other, of the predetermined plurality of control gains.

2. The vehicle turning control device as claimed in claim 1, wherein
  the vehicle traveling value information includes at least the road surface frictional coefficient,
  the predetermined plurality of control gains include at least first and second control gains $\alpha 1, \alpha 2$ which satisfy a magnitude relationship of $\alpha 1 < \alpha 2$,
  in the vehicle turning control device, two different road surface frictional coefficient threshold values that are a first road surface frictional coefficient threshold value pa and a second road surface frictional coefficient threshold value µb satisfying a magnitude relationship of µa >µb are predetermined for the road surface frictional coefficient, and
  the target yaw rate correction module
    when the road surface frictional coefficient is greater than the first road surface frictional coefficient threshold value pa, uses the target yaw rate calculated by the plural-target-yaw-rate calculation module with respect to the second control gain $\alpha 2$, as the target yaw rate with respect to the control gain calculated by the control gain calculation module,
    when the road surface frictional coefficient is smaller than the second road surface frictional coefficient threshold value µb, uses the target yaw rate calculated by the plural-target-yaw-rate calculation module with respect to the first control gain $\alpha 1$, as the target yaw rate with respect to the control gain calculated by the control gain calculation module, and
    when the road surface frictional coefficient is smaller than the first road surface frictional coefficient threshold value pa and greater than the second road surface frictional coefficient µb, uses the target yaw rate approximated with the interpolation, as the target yaw rate with respect to the control gain calculated by the control gain calculation module.

3. The vehicle turning control device as claimed in claim 1, wherein
  the vehicle traveling value information includes at least the road surface frictional coefficient,
  the predetermined plurality of control gains include at least first and second control gains $\alpha 1, \alpha 2$ which satisfy a magnitude relationship of $\alpha 1 < \alpha 2$,
  in the vehicle turning control device, two different road surface frictional coefficient threshold values that are a first road surface frictional coefficient threshold value pa and a second road surface frictional coefficient threshold value μb satisfying a magnitude relationship of μa >μb are predetermined for the road surface frictional coefficient, and the yaw moment correction module
- when the road surface frictional coefficient is greater than the first road surface frictional coefficient threshold value μa, uses the yaw moment calculated by the plural-yaw-moment calculation module with respect to the second control gain α2, as the yaw moment with respect to the control gain calculated by the control gain calculation module,
- when the road surface frictional coefficient is smaller than the second road surface frictional coefficient threshold value μb, uses the yaw moment calculated by the plural-yaw-moment calculation module with respect to the first control gain α1, as the yaw moment with respect to the control gain calculated by the control gain calculation module, and
- when the road surface frictional coefficient is smaller than the first road surface frictional coefficient threshold value μa and greater than the second road surface frictional coefficient μb, uses the approximated yaw moment with the interpolation, as the yaw moment with respect to the control gain calculated by the control gain calculation module.

4. The vehicle turning control device as claimed in claim 1, wherein
- the vehicle traveling value information includes at least the yaw rate deviation,
- the predetermined plurality of control gains include at least first and second control gains α1, α2 which satisfy a magnitude relationship of α1<α2,
- in the vehicle turning control device, two different yaw rate deviation threshold values that are a first yaw rate deviation threshold value ra and a second yaw rate deviation threshold value rb satisfying a magnitude relationship of ra<rb are predetermined for the yaw rate deviation, and
- the target yaw rate correction module
  - when the yaw rate deviation is smaller than the first yaw rate deviation threshold value ra, uses the target yaw rate calculated by the plural-target-yaw-rate calculation module with respect to the second control gain α2, as the target yaw rate with respect to the control gain calculated by the control gain calculation module,
  - when the yaw rate deviation is greater than the second yaw rate deviation threshold value rb, uses the target yaw rate calculated by the plural-target-yaw-rate calculation module with respect to the first control gain α1, as the target yaw rate with respect to the control gain calculated by the control gain calculation module, and
  - when the yaw rate deviation is greater than the first yaw rate deviation threshold value ra and smaller than the second yaw rate deviation threshold value rb, uses the target yaw rate approximated with the interpolation, as the target yaw rate with respect to the control gain calculated by the control gain calculation module.

5. The vehicle turning control device as claimed in claim 1, wherein
- the vehicle traveling value information includes at least the yaw rate deviation,
- the predetermined plurality of control gains include at least first and second control gains α1, α2 which satisfy a magnitude relationship of α1<α2,
- in the vehicle turning control device, two different yaw rate deviation threshold values that are a first yaw rate deviation threshold value ra and a second yaw rate deviation threshold value rb satisfying a magnitude relationship of ra<rb are predetermined for the yaw rate deviation, and
- the yaw moment correction module
  - when the yaw rate deviation is smaller than the first yaw rate deviation threshold value ra, uses the yaw moment calculated by the plural-yaw-moment calculation module with respect to the second control gain α2, as the yaw moment with respect to the control gain calculated by the control gain calculation module,
  - when the yaw rate deviation is greater than the second yaw rate deviation threshold value rb, uses the yaw moment calculated by the plural-yaw-moment calculation module with respect to the first control gain α1, as the yaw moment with respect to the control gain calculated by the control gain calculation module, and
  - when the yaw rate deviation is greater than the first yaw rate deviation threshold value ra and smaller than the second yaw rate deviation threshold value rb, uses the approximated yaw moment with the interpolation, as the yaw moment with respect to the control gain calculated by the control gain calculation module.

* * * * *

UNITED STATES PATENT AND TRADEMARK OFFICE
CERTIFICATE OF CORRECTION

PATENT NO. : 10,933,875 B2  
APPLICATION NO. : 16/195031  
DATED : March 2, 2021  
INVENTOR(S) : Yuta Suzuki Page 1 of 1

It is certified that error appears in the above-identified patent and that said Letters Patent is hereby corrected as shown below:

In the Claims

Column 16, Line 31, In Claim 2, delete "pa" and insert -- µa --, therefor

Column 16, Line 38, In Claim 2, delete "pa," and insert -- µa, --, therefor.

Column 16, Line 53, In Claim 2, delete "pa" and insert -- µa --, therefor.

Column 17, Line 1, In Claim 3, delete "pa" and insert -- µa --, therefor.

Signed and Sealed this  
Sixth Day of July, 2021

Drew Hirshfeld  
*Performing the Functions and Duties of the*  
*Under Secretary of Commerce for Intellectual Property and*  
*Director of the United States Patent and Trademark Office*